United States Patent [19]

Hance

[11] 4,229,230
[45] Oct. 21, 1980

[54] EXPENDABLE IMMERSION THERMOCOUPLE

[75] Inventor: Richard J. Hance, Philadelphia, Pa.

[73] Assignee: Leeds & Northrup Company, North Wales, Pa.

[21] Appl. No.: 952,756

[22] Filed: Oct. 19, 1978

[51] Int. Cl.³ ............................................. H01J 35/02
[52] U.S. Cl. ..................................... 136/234; 29/573; 136/236 R
[58] Field of Search .............. 29/573; 136/234, 236 R

[56] References Cited

U.S. PATENT DOCUMENTS

| | | | |
|---|---|---|---|
| 2,999,121 | 9/1961 | Mead | 136/234 |
| 3,298,874 | 1/1967 | Davies | 136/232 |
| 3,467,542 | 9/1969 | Nordlie | 136/234 X |
| 3,531,331 | 9/1970 | Davies | 136/234 |
| 3,698,954 | 10/1972 | Jones | 136/234 |
| 3,816,183 | 6/1974 | Kraus | 136/234 |

*Primary Examiner*—Leland A. Sebastian
*Attorney, Agent, or Firm*—Raymond F. MacKay; William G. Miller, Jr.

[57] ABSTRACT

An expendable immersion thermocouple having a cup-shaped body member for supporting the thermocouple and providing a cavity into which a refractory cement is poured to secure the thermocouple in place. The refractory cement is nonhomogeneous and has a surface region which is substantially composed of a high temperature refractory material such as alumina.

5 Claims, 1 Drawing Figure

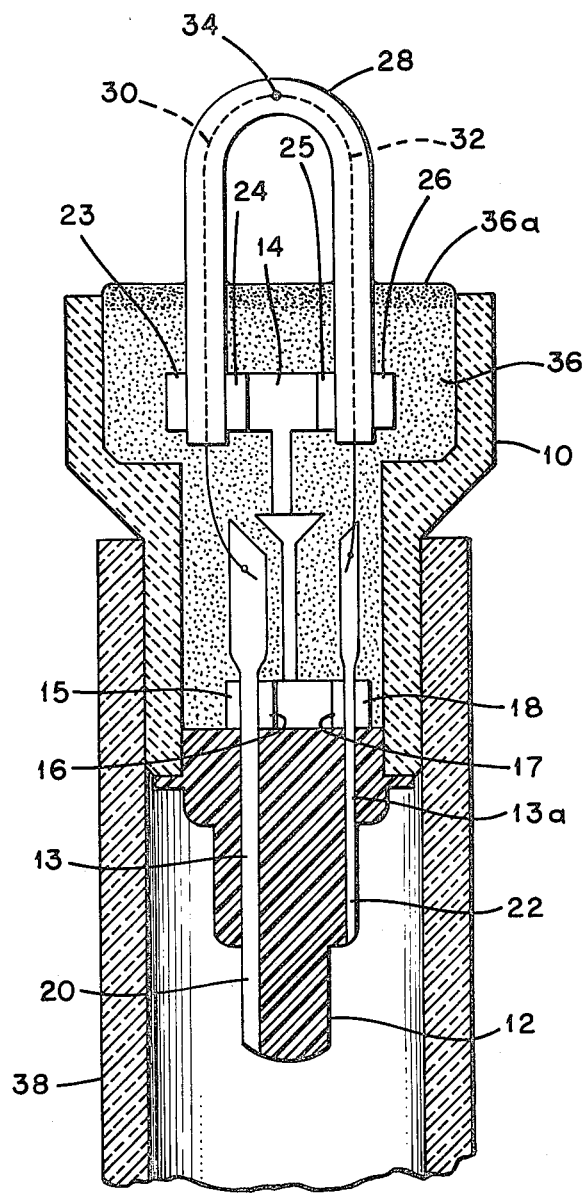

EXPENDABLE IMMERSION THERMOCOUPLE

BACKGROUND OF THE INVENTION

In U.S. Pat. No. 2,999,121-Mead, there is disclosed an expendable prefabricated thermocouple unit which may be easily and rapidly connected to temperature indicating equipment for making immersion temperature measurements in molten metal. After immersion in the bath of molten metal and the taking of a temperature measurement, the unit is discarded and replaced by another similar precalibrated unit. In U.S. Pat. No. 3,298,874-Davies, there is disclosed an improved expendable immersion thermocouple unit having a body member forming a cup portion which is filled with refractory cement during the manufacturing process. The refractory cement hardens to form a rigid body having electrical and heat insulating properties and to physically support the thermocouple.

Expendable immersion thermocouple units of the type disclosed in the Davies patent have enjoyed wide commercial use. It has been found, however, that an expendable immersion thermocouple manufactured in accordance with the teachings of the Davies patent may, under some circumstances, exhibit erratic temperature measurements during use and show mechanical failure of the refractory cement when removed from the molten metal bath. Such characteristics are most often encountered when the expendable immersion thermocouple devices are used with automatic insertion equipment that places the thermocouple in a vertical position during immersion in the molten metal bath.

It is not known why such expendable immersion thermocouples exhibit these characteristics. It is believed that during immersion in the molten metal bath that the mass of refractory cement, under the influence of the temperature of the molten metal, liberates gases due at least in part to the residual moisture in the cement. The rapid and violently escaping gases cause the temperature of the thermocouple junction to cool by forcing the cooler metal near the surface of the thermocouple unit to contact the thermocouple protection tube near the thermocouple junction to produce an erratic temperature measurement which is not the true reading of the temperature of the molten metal. It is further believed that the violent liberation of gas from the refractory cement causes a spalling of the surface of the cement.

Many different approaches have been used to try to overcome the problem referred to above but without success. It has been discovered that if the surface of the refractory cement is caused to have a preponderance of a high temperature refractory material such as alumina, conditions that produce an erratic temperature measurement and physical damage to the prior art expendable immersion thermocouple do not produce the erratic temperature measurement or the physical damage to thermocouple unit.

While it is not understood completely why the case or surface zone of the high temperature refractory material at the exposed surface of the refractory cement produces the improved performance, it is believed that the high temperature refractory material produces a thermal barrier so that during the very short immersion time, i.e. 5-10 seconds, the mass of refractory cement does not become sufficiently heated to produce the quantity of liberated gas experienced with the prior art expendable immersion thermocouples. Additionally, during the time of immersion the surface zone or skin containing the high refractory material becomes soft and allows the reduced volume of liberated gases to escape in a less violent manner than is obtained with a harder surface. The less violent escape will result in a lower velocity to reduce the mixing of cooled molten metal with the hot metal in the vicinity of the hot junction of the thermocouple. Finally, the soft surface also tends to provide a mechanical holding action on the unfired mass of refractory cement to prevent the spalling and mechanical damage encountered with expendable immersion thermocouples of the prior art.

It is an object of this invention to provide an improved expendable immersion thermocouple that does not exhibit erratic readings or mechanical breakage of the refractory surface when inserted vertically in a bath of molten metal.

DESCRIPTION OF THE DRAWINGS

The FIGURE is a sectional view of an expendable immersion thermocouple.

Referring to the FIGURE, there is shown an expendable immersion thermocouple constructed of a cup-shaped body member 10 which preferably is formed of a molded ceramic material such as Cordierite. The lower end of the body member 10 is closed by a tailpiece 12, preferably of a resilient plastic such as polypropylene which is, during the manufacturing process, glued to the bottom of the cup-shaped body member 10. A thermocouple support member 14 also preferably molded from resilient plastic such as polypropylene has molded into its base, a series of projections 15-18. Projections 15 and 16 are arranged to resiliently secure an electrical conductor 20 to the thermocouple support member 14. Similarly, projections 17 and 18 are arranged to resiliently secure an electrical conductor 22 to the thermocouple support member 14.

The upper end of the thermocouple support member 14 is provided with a series of projections 23-26. These projections are arranged to resiliently secure to the thermocouple support member 14 an electrically insulating heat-transmitting tube 28. Threaded within the bore of the tube 28 are a pair of thermocouple wires 30 and 32 which are joined together to form a thermocouple hot junction 34. When the expendable immersion thermocouple is intended for measuring the temperature of molten steel, the thermocouple wires will usually be of platinum/platinum rhodium. As shown, the lower end of thermocouple wire 30 is electrically attached to electrical conductor 20 and the lower end of thermocouple wire 32 is shown electrically attached to the electrical conductor 22.

In the manufacture of the expendable immersion thermocouple, the tailpiece 12 having holes 13 and 13a is glued to the bottom of the cup-shaped body member 10. The thermocouple support member 14, having resiliently secured to it the electrical conductors 20 and 22 as well as the quartz tube 28 with the thermocouple wires 30 and 32, is inserted into the cup-shaped cavity in the body member 10 with the electrical conductor 20 entering the hole 13 of the tailpiece 12 and the electrical conductor 22 entering the hole 13a of the tailpiece 12. It will be noted from the FIGURE that the holes 13 and 13a are of different diameter and the electrical conductors 20 and 22 are similarly of different diameters so that the thermocouple support member 14 must be inserted in the body member 10 with a predetermined orientation. With such an arrangement, the proper polarity of the thermocouple voltage to the temperature measuring instrument is assured. The thermocouple support member 14 is inserted into the body member 10 until the lower surface of the thermocouple support member 14 engages the upper surface of the tailpiece 12.

With the parts so assembled, the cavity in the cup-shaped body member 10 is filled with a refractory cement 36. While the refractory cement may be of any type known to those skilled in the art, it generally is a water based mixture including alumina, calcia, and silica as refractory materials together with appropriate binders. After the refractory cement, which is in the form of a slurry, is poured into the cup-shaped cavity in body member 10, a layer or zone of high refractory material, such as alumina, and identified by reference character 36a, is formed within the exposed surface of the refractory cement 36. While this layer 36a may be produced in any of a number of ways, it has been found preferable to dust onto the wet surface of the refractory cement 36 a powdered alumina until the surface is completely covered with the alumina powder. The assembly is then allowed to dry in conventional manner to permit substantially all of the water vapors to evaporate from the mass of the cement. During this drying period, there is presumed to be a migration of the alumina powder into the moist cement 36 accompanied by migration of the refractory cement binder material into the powdered alumina. The result is that there is formed within the exposed surface of the refractory cement 36 a case or zone approximately 0.8 mm thick of alumina which is sufficiently bonded to the refractory cement 36 that vibration, mechanical and thermal shock does not damage the zone 36a or cause it to separate from the refractory cement 36.

After the expendable immersion thermocouple cartridge has sufficiently dried, the thermocouple end of the body member 10 is covered by a protective metal cap and the unit is secured in the end of a suitable tube 38 for immersion in molten metal, all as disclosed in U.S. Pat. No. 3,298,874.

While the layer 36a has been described as applied by way of an alumina powder, it is to be understood that other techniques may be employed to impart to the surface of the refractory 36 a protective high refractory layer 36a. Alternatively, a slurry including alumina could be spread over the exposed surface of the refractory 36 to produce the high refractory layer 36a. Also, high refractory materials other than alumina may be used, such, for example, as magnesia.

What is claimed is:

1. In the method of manufacture of an expendable immersion thermocouple having a thermocouple enveloped in a high temperature protective tube and secured in the face of a body member by a mass of refractory cement, the improvement comprising the step of forming within the exposed face of said refractory cement a zone of high temperature refractory material comprising alumina or magnesia.

2. The method of claim 1 in which said high temperature refractory material is deposited in the form of a powder on said refractory cement when said refractory cement is moist.

3. The method of claim 1 in which said high temperature refractory material is a slurry including said higher temperature refractory material in powder form which is spread onto the exposed face of said refractory cement.

4. In an expendable immersion thermocouple for the measurement of the temperature of molten metal having a thermocouple enveloped in a protective tube which projects from the face of a body member for contact with said molten material and in which said tube is secured in said body member by a mass of refractory cement including a mixture of refractory material having differing thermal characteristics and having a surface which also is exposed to said molten material when immersed, the improvement comprising a layer of high refractory material comprising alumina or magnesia within the exposed surface of said refractory cement.

5. Apparatus as claimed in claim 4 in which said layer of high refractory material has a depth in the order of 0.8 mm.

* * * * *